United States Patent
Scheifler et al.

(10) Patent No.: US 7,565,533 B2
(45) Date of Patent: Jul. 21, 2009

(54) SYSTEMS AND METHODS FOR PROVIDING OBJECT INTEGRITY AND DYNAMIC PERMISSION GRANTS

(75) Inventors: Robert W. Scheifler, Somerville, MA (US); Timothy J. Blackman, Arlington, MA (US); Michael P. Warres, Cambridge, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 762 days.

(21) Appl. No.: 10/287,608

(22) Filed: Nov. 5, 2002

(65) Prior Publication Data

US 2004/0216150 A1    Oct. 28, 2004

(51) Int. Cl.
   *H04K 1/10* (2006.01)
   *H04L 29/06* (2006.01)
   *G06F 3/00* (2006.01)
(52) U.S. Cl. .................. 713/167; 380/33; 715/749; 719/330
(58) Field of Classification Search ......... 709/201–207, 709/217–219, 223–226, 229; 713/150–194, 713/167; 717/162–167; 719/311, 315, 316, 719/328, 330–332; 726/1–33; 380/33; 715/749
See application file for complete search history.

(56) References Cited

U.S. PATENT DOCUMENTS

| 5,311,596 | A  | * | 5/1994  | Scott et al. ............. 380/33 |
| 6,185,611 | B1 |   | 2/2001  | Waldo et al. ........... 709/221 |
| 6,226,746 | B1 | * | 5/2001  | Scheifler ................ 726/1 |
| 6,243,716 | B1 |   | 6/2001  | Waldo et al. ........... 707/202 |
| 6,640,334 | B1 | * | 10/2003 | Rasmussen ............. 717/171 |
| 7,073,062 | B2 | * | 7/2006  | Leung et al. ........... 713/169 |
| 7,120,926 | B1 | * | 10/2006 | Safadi et al. ........... 725/132 |
| 2002/0035591 | A1 | * | 3/2002 | Kimura ................ 709/200 |
| 2002/0104022 | A1 | * | 8/2002 | Jorgenson ............. 713/201 |
| 2002/0116706 | A1 | * | 8/2002 | Bahraini .............. 725/32 |
| 2002/0124118 | A1 |   | 9/2002 | Colley et al. .......... 709/315 |
| 2003/0037239 | A1 | * | 2/2003 | Leung et al. .......... 713/169 |
| 2003/0046415 | A1 | * | 3/2003 | Kaijyu et al. ......... 709/230 |
| 2003/0084138 | A1 | * | 5/2003 | Tavis et al. ........... 709/223 |

FOREIGN PATENT DOCUMENTS

WO    WO 00/62142    10/2000

* cited by examiner

*Primary Examiner*—Lewis A Bullock, Jr.
*Assistant Examiner*—Charles E Anya
(74) *Attorney, Agent, or Firm*—Sonnenschein Nath & Rosenthal LLP

(57) ABSTRACT

Systems and methods for securing the content integrity of and access to object data and code in a distributed system. Content protecting URLs provide a mechanism for checking code or data transmitted out-of-band. Dynamic permission grants are supported during program execution for code or users unknown prior to runtime.

12 Claims, 11 Drawing Sheets

SYSTEMS AND METHODS FOR PROVIDING OBJECT INTEGRITY AND DYNAMIC PERMISSION GRANTS

FIELD OF THE INVENTION

The present invention relates generally to systems and methods for providing security for code and resources available in a distributed network.

BACKGROUND OF THE INVENTION

Security is a fundamental issue in network communications, particularly where it involves the sharing of resources over the network. In a distributed system, resources (e.g., hardware resources such as printers, data resources such as files, and software resources such as applications) located at remote computers communicate and coordinate their actions by passing messages. Examples of such distributed systems include: the Internet; an intranet (a portion of the Internet managed by an organization); and a mobile computing network.

Security may encompass a desire to guarantee the privacy, integrity and/or availability of resources in a distributed system. Cryptography provides a basis for authentication of messages, as well as their secrecy and integrity. Cryptography is implemented through a security protocol, the protocol defining the cryptographic algorithms used, and the management of keys. Public-key cryptography makes it easy to distribute cryptographic keys, but its performance may be inadequate for the encryption of bulk data. Secret-key cryptography is more suitable for bulk encryption tasks. Hybrid protocols, such as Secure Sockets Layer (SSL), establish a secure channel by public key cryptography and then use the secure channel to exchange secret keys for use in subsequent data exchanges.

Some programming languages enable programs (executable code) to be loaded into a local process from a remote server and then executed locally; the transferred code generally being referred to as "mobile code." In such cases, the internal interfaces and objects within the local process are exposed to attack by the mobile code.

Java™ is perhaps the most widely used language of this type. The Java Virtual Machine (JVM) is designed with mobile code in view. It gives each application its own environment in which to run. Each environment has a security manager that determines which resources are available to the application. For example, the security manager might prevent an application from reading and writing files, or give it limited access to a network connection.

Java applets are a well-known and widely-used example of mobile code. A user, running a browser, selects a link to an applet whose code is stored on a web server. The code is downloaded to the browser and runs on the browser locally to provide, for example, a better interactive response—i.e., one that does not suffer from the delays and variability of bandwidth associated with network communications. FIG. 1 illustrates the use of a Web applet; in part a), a client's request results in the downloading of applet code; and in part b), the client interacts locally with the downloaded applet.

When a user runs a program (such as a browser) that downloads mobile code (e.g., a Java applet) to be run locally on its behalf, the user has no good reason to trust the code to behave in a responsible manner. In fact, there is a danger that the downloaded code will be "malicious code" that removes files or accesses private information. To protect users against untrusted code, most browsers specify that applets cannot access local files, printers, or network sockets. Some users of applications of mobile code are able to assume various levels of trust in downloaded code. In such cases, the security managers are configured to provide more access to local resources. For example, after receiving code from a designated "trusted source", the code may be allowed greater access to local resources.

In object-oriented distributed systems, there are many types of objects to which access control must be applied, and the decisions are often application specific. A "protection domain" is generally described as a domain that specifies the resources that can be accessed by processes executing within the domain and specifies the operations permitted on each resource. A protection domain in one implementation of an object-oriented system groups together a set of classes which are granted the same set of permissions. The protection domain is associated with a class loader from which the classes are loaded, a code source indicating the location from which the classes are loaded, and a (possibly empty) set of principals representing aspects of the identity of the entity (e.g., user) which is executing the code belonging to the classes. A given protection domain is mapped by a security policy to the set of permissions granted to classes belonging to that protection domain; the permissions themselves designate privileged resources or actions that can be accessed or exercised by parties granted the permissions.

The protection of Java programs that include mobile code is based upon the protection domain concept—local code and downloaded code may be provided with different protection domains in which to execute. There can be a protection domain for each downloaded source, with access rights for different sets of local resources, depending upon the level of trust that is placed in the downloaded code.

In an ideal world, communication would always be between mutually trusting processes and secure channels would always be used. There are many reasons why this ideal is not attainable. There is overhead (cost) associated with security procedures. Access to internal networks may be controlled by firewalls (firewalls produce a local communication environment in which all external communication is intercepted). But firewalls offer no protection against attacks from inside an organization. Finally, access to services on the Internet must be unrestricted, because the goal is to offer services to a wide range of users. Thus, security issues are simply inherent in the open nature of many distributed systems.

SUMMARY OF THE INVENTION

Systems and methods consistent with the present invention, described herein by various implementations, provide for content integrity of code downloaded out-of-band.

According to one implementation, a method is provided which includes downloading in-band, for a remote call in a distributed system, data of an object and a code base URL for code of the object. The method further includes downloading the code out-of-band using the code base URL to ensure content integrity of the code. The downloaded data and code may be for transfer of an object in a remote method invocation. The method may further include, prior to using the code base URL, confirming that the code base URL is a content integrity protecting URL. In using the code base URL to ensure content integrity, the method may employ a protocol identified in the URL, or a message digest included in the URL.

In another implementation, a method is provided which includes receiving in-band in a distributed system a code base URL for code of an object, and determining whether the code base URL is a content integrity protecting URL.

In another implementation, a distributed system is provided which includes a server computer, including a memory with a service program and a processor that runs the service program, and a client computer, including a memory with a client program and a processor that runs the client program. A secure channel, between the server computer and the client computer, provides content integrity for transmission of data (of an object) and a code base URL (for code of the object). A program is provided which includes a method using the code base URL to ensure content integrity while transmitting the code on another channel between the server computer and the client computer.

In another implementation, a computer-readable medium is provided containing instructions to perform a method in a distributed system. The method includes downloading in-band, from a server to a client in a distributed system, data of an object and a code base URL for code of the object, and downloading the code out-of-band to the client using the code base URL to ensure content integrity of the code.

In another implementation, a computer-readable medium containing instructions for verifying use of a content integrity protecting URL is provided, the method including testing every URL in a code base URL to confirm that every such URL provides content integrity.

In another implementation, a method is provided including transmitting on a secure channel, from a sender to a receiver in a distributed system, data of an object and a code base URL for code of the object. The code is transmitted on another channel to the receiver while using the code base URL to determine content integrity of the transmitted code.

In another implementation, an apparatus is provided which includes means for transmitting on a secure channel, from a sender to a receiver in a distributed system, data of an object and a code base URL for code of the object. The apparatus further includes means for transmitting the code on another channel to the receiver while using the code base URL to determine content integrity of the transmitted code.

Other systems and methods are described herein, by various implementations consistent with other aspects of the present invention, in which a URL is provided that includes a cryptographic checksum for use in providing content integrity for out-of-band data.

According to one implementation, a method is provided which includes transmitting a URL on a channel that provides content integrity of the URL, the URL including a location from which data should be retrieved and a cryptographic checksum of the data. The method further includes using the URL to retrieve the data and confirming the integrity of the data with the cryptographic checksum. The cryptographic checksum may comprise a message digest. The location of the data may be a non-secure HTTP server. The non-secure HTTP server may fail to provide at least one of authentication and content integrity.

In another implementation, an apparatus is provided which includes means for transmitting a URL on a channel that provides content integrity of the URL, the URL including a location from which data should be retrieved and a cryptographic checksum of the data. Also included is a means for using the URL to retrieve the data and confirming the integrity of the data with the cryptographic checksum.

In another implementation, a computer-readable medium contains instructions for performing a method, including the above described transmitting and using steps.

In another implementation, a content integrity protecting URL is provided which specifies a location from which data should be retrieved and a cryptographic checksum of the data.

Still further, systems and methods are described herein, by various implementations consistent with other aspects of the invention, which provide for dynamic granting at runtime of permissions.

According to one implementation, a method is provided including dynamic granting at runtime of a set of permissions allowed for currently executing code in a protection domain, based on a specified combination of class loader and principal (s). The method may further include permission checking of the dynamically granted set of permissions for a specified combination of protection domain and permission. The method may further include permission checking of statically granted permissions. The protection domain may identify one or more of a source of the executing code, a signer of the executing code, a subject of the executing code, and the class loader of the executing code.

In another implementation, a computer-readable medium is provided containing instructions for performing the above described method.

In another implementation, a dynamic security policy object is provided including a set of permission mappings which include dynamically granted permissions allowed for currently executing code.

In one implementation, a computer-readable medium is provided containing instructions to perform a method, the method including dynamically granting at runtime a set of permissions to class loader objects unknown prior to runtime.

In other implementations, a computer-readable medium contains instructions to perform a method, the method including dynamically granting at runtime a set of permissions to class loader objects for subjects and/or code unknown prior to runtime.

In another implementation, an apparatus is provided which includes means for dynamically granting at runtime a set of permissions allowed for currently executing code in a protection domain, based on a specified combination of class loader and principal(s). The apparatus further includes means for permission checking of the dynamically granted set of permissions for a specified combination of protection domain and permission.

DETAILED DESCRIPTION

Figure 1A:
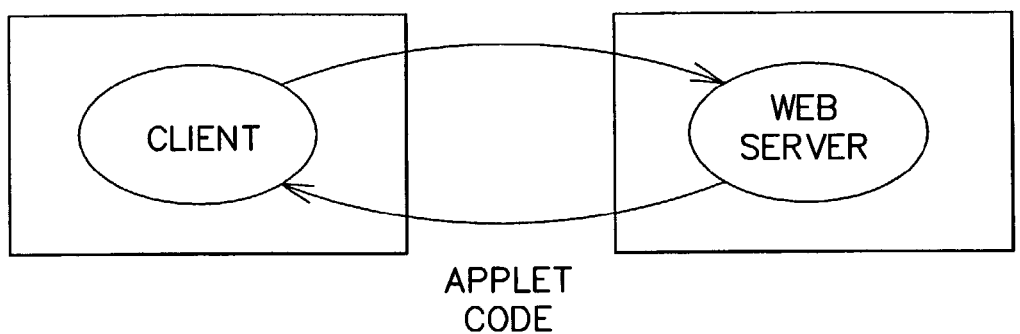
FIG. 1 is a schematic diagram illustrating the use of a web applet, where in FIG. 1a a client's request results in downloading of applet code, and in FIG. 1b the client interacts locally with the downloaded applet.
Figure 1B:
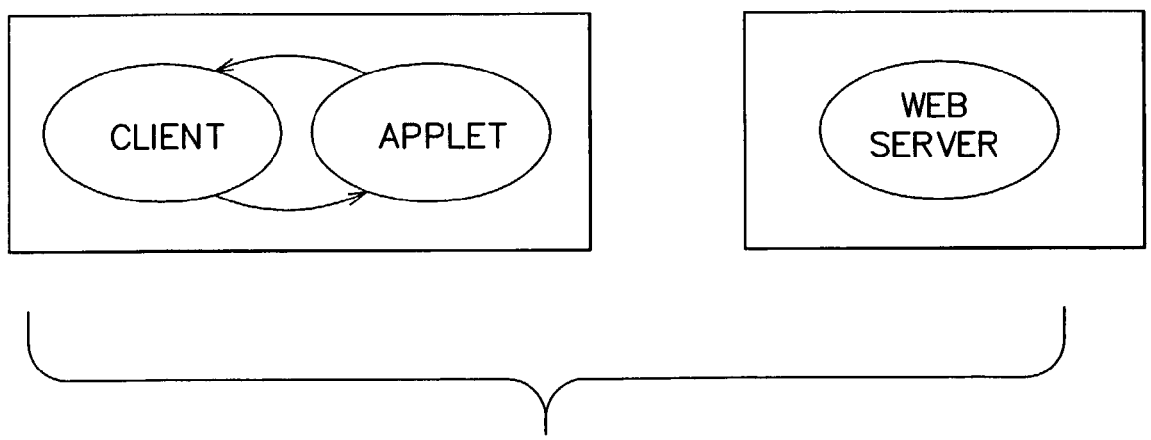

Various implementations consistent with the present invention will now be described. These are by way of example only, and not limiting. In some of these examples, the World Wide Web functions as the distributed system. A background summary of certain relevant features of the Web will be provided as context for the described implementations.

the Web as an Exemplary Distributed System

The World Wide Web (www.w3.org) is an evolving system for publishing and accessing resources and services across the Internet. It is a type of distributed system that can be constructed in the form of interacting clients and servers. The term "server" refers to a running program (a process) on a network computer that accepts requests from programs running on other computers to perform a service and respond appropriately. The requesting processes are referred to as clients. A "client" invokes an operation upon the server by sending the request (a message) for the operation to be carried out. A reply message is sent from the server to the client. A complete interaction between the client and the server is called a remote invocation.

The same process may be both a client and a server, and thus the terms "client" and "server" apply only to the roles played in a single request.

An executing web browser is an example of a client. The web browser communicates with a web server to request web pages from it.

The Web is open with respect to the types of "resources" that can be published and shared on it. In its simplest form, a resource (on the Web) is a web page or some other type of content that can be stored in a file and presented to the user; examples of such resources include program files, media files, and documents in PostScript or Portable Document Format.

However, the Web has moved beyond simple data resources to encompass services, such as electronic purchasing of goods. Some web services require some service-related code to run inside the browser, at the user's computer. For example, an applet is an application that the browser automatically downloads and runs when it fetches a corresponding web page.

Accessing Resources on the Web

Three main components for accessing resources on the Web are:

hypertext mark-up language (HTML), a language for specifying the content and layout of pages as they are displayed by web browsers; HTML is also used to specify a link, a reference to another document or resource stored on the Web;

uniform resource locators (URLs), which identify documents and other resources stored as part of the Web; and hypertext transfer protocol (HTTP), a protocol (standard rules for interaction) by which browsers and other clients fetch documents and other resources from web servers.

For example, HTML text for specifying a web page is stored in a file that a web server can access. A web browser retrieves the contents of this file from the web server, reads the contents returned by the server, and renders it into formatted text and images laid out on a web page. It is the browser, not the server, that interprets the HTML text.

HTML commands, known as tags, are enclosed by angle brackets. For example, the URL contained in an <A HREF . . . > tag specifies a link in a web page. The following example is taken from "Distributed Systems, Concepts and Design," S. Coulouris et al., p. 10, Addison-Wesley 2001:

<A HREF="http://www.cdk3.net/WebExample/moon.html"> MOON </A>

When a user clicks on the link's displayed text (Moon), the browser retrieves the resource identified by the corresponding URL and presents it to the user. In this example, the resource is an HTML file specifying a web page about the Moon.

The purpose of a uniform resource locator (URL) is to identify the location of a resource. On the Web, a user sometimes types a URL into a browser, but more commonly the browser looks up the corresponding URL when a,user clicks on a link, or when the browser fetches a resource embedded in a web page.

A full URL has two top-level components:

scheme: scheme-specific-location

The "scheme" declares the type of URL—i.e., URLs are required to specify the locations of a variety of resources and also to specify a variety of communication protocols to retrieve them. By way of example (see Coulouris, p. 11):

mailto:joe@anISP.net identifies a user's e-mail address; and ftp.//ftp.downloadlt.com/software/aProg.exe identifies a file that is to be retrieved using the File Transfer Protocol (FTP). The prior example (http:// . . . ) identified a file to be retrieved using the HTTP protocol. Other examples of schemes are "nntp" (used to specify a Usenet news group), and "telnet" (used to log in to a computer).

HTTP URLs are the most widely used for fetching resources using the standard HTTP protocol. An HTTP URL has two main functions: to identify which web server maintains the resource, and to identify which of the resources at that server is required. In general, HTTP URLs are in the following form:

http://servername [:port] [/pathNameOnServer] [?arguments]

The items in square brackets are optional. A full HTTP URL begins with the string "http://" followed by a server name expressed as a Domain Name Server (DNS) name. Web servers and most other Internet services are clients of the DNS service, which translates domain names to network addresses. The server's DNS name is optionally followed by the number of the "port" on which the server listens for a request. Then comes an optional path name of the server's resource. If this is absent then the server's default web page is provided. Finally, the URL optionally ends in a set of arguments, for example when a user submits entries in the form of a search engine's query page.

HTTP is a "request-reply" type of protocol. A client sends a request message to the server containing the URL of the required resource. The server looks up the path name (designated in the URL) of the file and, if it exists, sends back the file's contents in a reply message to the client. The server includes the content type in the reply message so that the browser will know how to process it. The string that denotes the content type is called a MIME type; they are standardized in RFC 1521. For example, if the content is of type "text/html", the browser will interpret the text as HTML and display it. If the content is of type "image/GIF," then the browser will render the contents as an image in GIF format.

Figure 2:
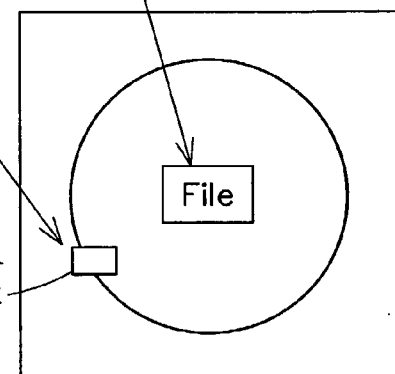
FIG. 2 is a schematic diagram illustrating a process for translating a URL into a network address and locating the resource identified in the URL.

FIG. 2 illustrates the above-described process for translating a URL into a network address, and locating the file (resource) identified by the pathname in a destination server (taken from Coulouris, p. 355).

Transmitting Messages on the Internet

Figure 3:
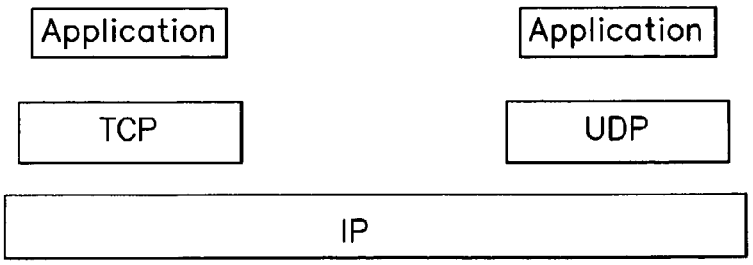
FIG. 3 is a conceptual view of the layers in a TCP/IP Internet.

TCP/IP is the protocol suite used by the Internet. TCP stands for Transmission Control Protocol, and IP for Internet Protocol. FIG. 3 shows a conceptual view of the TCP/IP Internet, with the application layer on top, the transport layer in the middle, and the IP datagram layer on the bottom.

IP datagrams provide the basic transmission mechanism for the Internet and other other TCP/IP networks. Above the IP datagram layer there are two transport protocols: TCP is a reliable connection-oriented protocol, and UDP is a datagram protocol that does not guarantee reliable transmission. Above the transport layer, one or more application layers are provided in which messages are sent as UDP packets or TCP streams.

For example, HTTP requests and replies are usually transported by the direct use of TCP. However, when end-to-end security is required, a Secure Sockets Layer (SSL) protocol is layered on top of TCP to produce a secure channel, and the HTTP messages are then transmitted via the secure channel.

The IP layer (bottom layer in FIG. 3) provides an unreliable or best-efforts delivery, in which packets can be lost, duplicated, delayed or delivered out of order. There is no data checksum, to avoid creation of overhead when passing through routers. It is thus left to the higher level protocols, TCP and UDP, to provide their own checksums.

TCP and UDP, as transport protocols, provide process-to-process communication. This is accomplished by the use of ports. Port numbers are used for addressing messages to processes within a particular computer. Once an IP packet has been delivered to a destination host, the TCP or UDP layer software dispatches it to the desired process via a specific port at that host.

The application program interface (API) to UDP provides a message passing abstraction for inter-process communication. This enables a sending process to transmit a single message to a receiving process. The independent packets containing these messages are called datagrams. In Java and Unix APIs, the sender specifies the destination process using a socket—an indirect reference to a particular port used by the destination process at the destination computer.

The application program interface to TCP is an abstraction of a two-way stream between pairs of processes. The information communicated consists of a stream of data items with no message boundaries.

Figure 4:
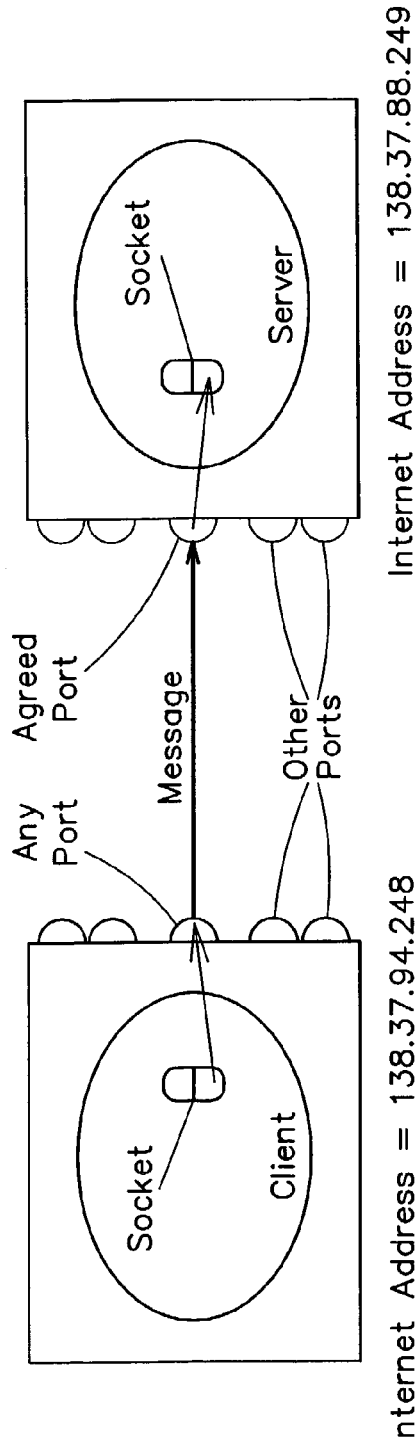
FIG. 4 is a schematic diagram illustrating an interprocess communication.

Both forms of communication, UDP and TCP, use the socket abstraction, which provides an end point for communication between processes. Interprocess communication consisting of transmitting a message between a socket in one process and a socket in another process, is illustrated in FIG. 4 (taken from Coulouris, p. 129). For a process to receive messages, its socket must be bound to a local port and one of the Internet addresses of the computer on which it runs.

Remote Procedure Calls and Remote Method Invocation

Figure 5:
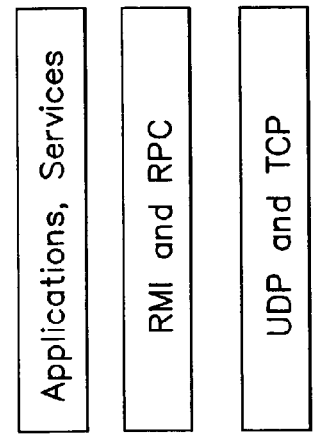
FIG. 5 is a conceptual view of the middleware RMI and RPC layers.

Distributed applications, composed of cooperating programs running in several different processes, need to be able to invoke operations in other processes, often running in different computers. To achieve this, the conventional (local) procedure call model is extended to the remote procedure call (RPC) model, which allows client programs to call procedures in server programs running in separate processes and generally on different computers (from the client). Further, where an object-based programming model is used, the procedure call model is extended to allow objects in different processes to communicate with one another by means of remote method invocation (RMI). RMI is an extension of local method invocation that allows an object living in one process to invoke the methods of an object living in another process. These RMI and RPC "middleware" layers exist, as illustrated in FIG. 5, between the upper applications/services layer and the lower UDP/TCP transport layer. Finally, an event-based programming model allows objects to receive notification of events of other objects in which they have registered interest. This model has been extended to allow distributed event-based programs to be written. Most current distributed system software is written in object-oriented languages.

An object-oriented program, for example in Java or C++, consists of a collection of interacting objects, each of which consists of a set of data and a set of methods. An object communicates with other objects by invoking their methods, generally passing arguments and receiving results. Objects are said to encapsulate the data and the code of their methods.

In the distributed object model, a remote interface specifies the methods of an object that are available for invocation by objects in other processes. These methods and remote interfaces can pass objects as arguments and as results of methods. In addition, references to remote objects may also be passed.

The request and reply messages of RPC and RMI provide fields enabling authentication information to be passed between client and server. For example, the request message may contain the credentials of the user running the client program. Access control mechanisms can be built on top of the authentication information which is provided to the server. The server program is responsible for enforcing access control by deciding whether to execute each procedure call or remote method invocation according to the authentication information. For example, if the server is a file server, it can check whether the user has sufficient rights to carry out a requested file operation. Several different authentication protocols can be supported, such as a shared key for the signing of RPC or RMI messages, or a Kerberos style of authentication. A field in the RPC or RMI header may indicate which style is being used.

Providing Object Integrity by the use of Integrity-Protecting URLs

In communication systems that provide network security, integrity of in-band data is often provided by use of a Message Authentication Code (MAC). However, when using Java™ Remote Method Invocation (RMI) or Jini™ Technology, the contents of a remote call generally consists of objects, not just data. Thus, what is transmitted is not only the data representation of objects, but also the executable code for the classes that interpret and manipulate that data. When transmitting objects, it is desirable to maintain the integrity of both the data and the code. Good data may be useless if it is manipulated by corrupted code, and good code may be useless if it is manipulating corrupted data.

Systems and methods according to one implementation of the present invention provide for content integrity of both object data and code. The data and a code base URL are transmitted in-band as part of a remote call. While the executable code is downloaded out-of-band, the code base URL, that is transmitted in-band, is used to confirm content integrity of the downloaded code. As a result, the integrity of both out-of-band code as well as in-band data are preserved.

In this implementation object integrity can be maintained by using an existing data integrity mechanism for in-band data, coupled with code base URLs that provide content integrity for out-of-band downloaded code. Because the URLs themselves are sent as part of the in-band data, the integrity of the URLs is maintained. When the URLs are then used to download the associated code, either the URL protocols that are employed or the contents of the URL are used to ensure the integrity of the downloaded code. The combined result is complete object integrity, of both data and code.

The expansion from data integrity to object integrity may apply to objects sent in either or both directions during a remote call, e.g., arguments to the remote calls sent from client to server, and any returned value or exception sent from the server to the client.

As with data integrity, it is the recipient of an object that confirms code integrity. Thus, the recipient will confirm that integrity-protected URLs are in fact being used for any code that is downloaded. Note, the recipient need not require integrity protecting URLs for code that is resolved locally.

In this implementation, where an out-of-band communication is used to download code, the integrity protecting URLs may either:

(1) contain sufficient information (such as a message digest) to independently verify integrity after the content is downloaded; or (2) contain (a) sufficient information to authenticate the origin of the content, and (b) use sufficient means (such as a MAC) to maintain content integrity in transit.

The following are three examples of integrity-protecting URLs.

A first example is referred to as a HTTPS URL, which protects integrity by utilizing a TLS/SSL cipher suite to provide server authentication and data integrity. This is an example of a URL that contains sufficient information to authenticate the origin of the content, namely, the host name, and uses sufficient means to maintain content integrity in transit (namely, a MAC).

A second example of an integrity-protecting URL is referred to as a HTTPMD URL. In this case the URL itself contains a message digest (MD) value. As the content (code) is downloaded, a digest is computed based on the received content, and compared with the URL (expected) digest value. This is an example of a URL that contains sufficient information to independently verify integrity after the content is downloaded.

A third example of an integrity-protecting URL is a FILE URL that does not reference a remote host. In other words, the host component is null, empty, "localhost", or "~", provided either the local operating system is not configured to mount remote file systems, or the underlying remote file system protocols used provide adequate data integrity and authentication of the remote hosts. In this case, the assumption is that local file systems have sufficient integrity such that no additional verification is required.

Rather than mandating which URLs provide content integrity, a pluggable framework can be used to determine if all of the URLs in a code base provide content integrity. A set of integrity verifiers can be configured into the framework using resource settings. An integrity verifier takes a URL and returns a Boolean result, where a "true" result means the verifier confirms that use of the URL will maintain content integrity, while a "false" result means the verifier cannot confirm integrity. A URL is confirmed to maintain content integrity if at least one verifier returns true.

Figure 6:
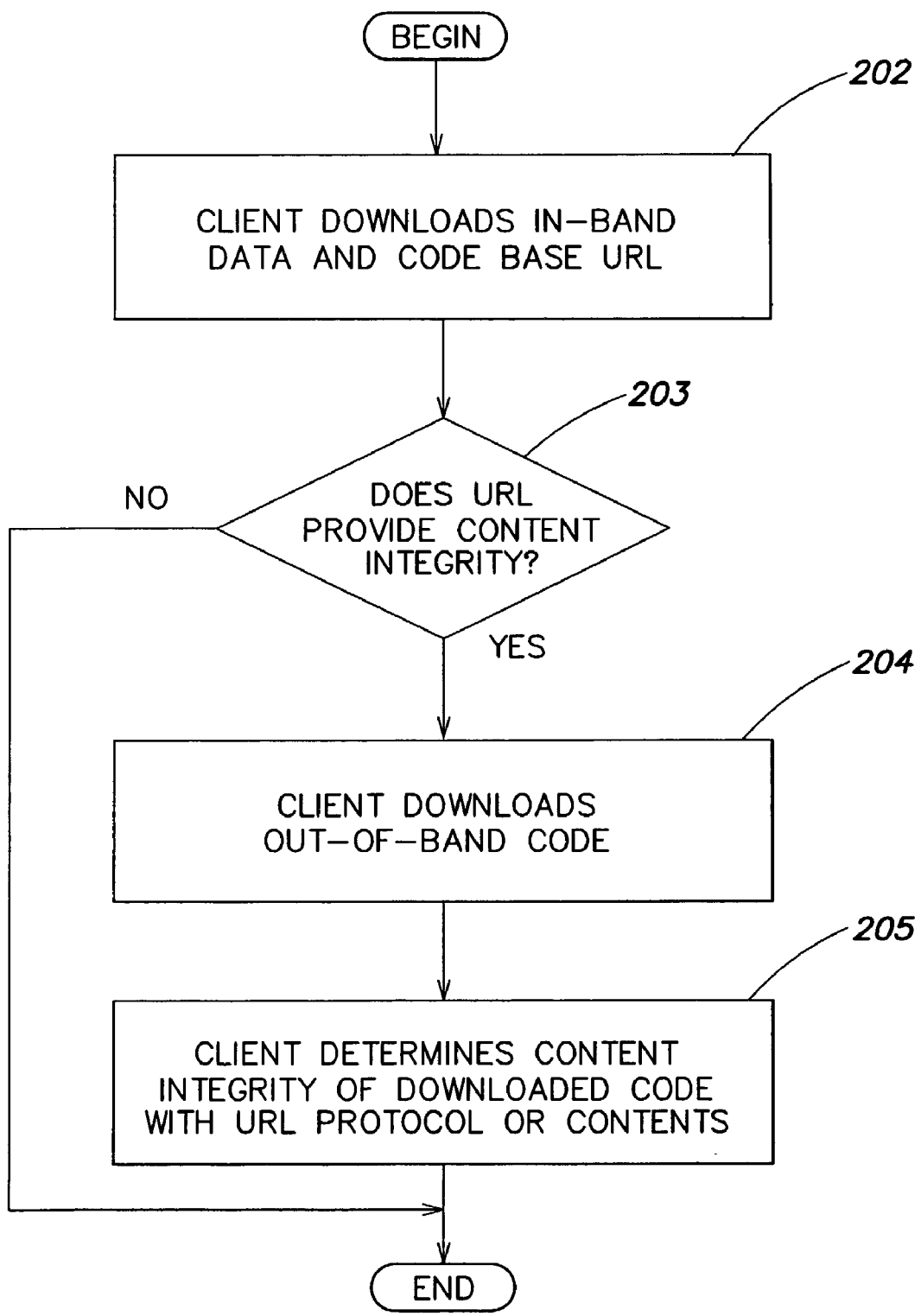
FIG. 6 is a flow chart illustrating a method according to one implementation of the invention for ensuring content integrity of code downloaded out-of-band.

FIG. 6 is a high-level flow chart of an exemplary method for establishing content integrity in downloaded code consistent with one implementation of the present invention. The exemplary method begins when the client downloads in-band both data and a code base URL from a service (step 202). The client then verifies whether the URL provides content integrity (step 203). If it does, the client downloads the code out-of-band (step 204). The client determines the content integrity of the downloaded code with the designated URL protocol or with the contents of the URL as previously described (step 205). Returning to step 203, if the URL does not provide content integrity, the client cannot rely on the above-described mechanism for determining content integrity of the downloaded code and the method ends.

In step 205, the integrity-protecting URL may be, for example, any one of HTTPS, HTTPMD, or local file as previously described.

Figure 7:
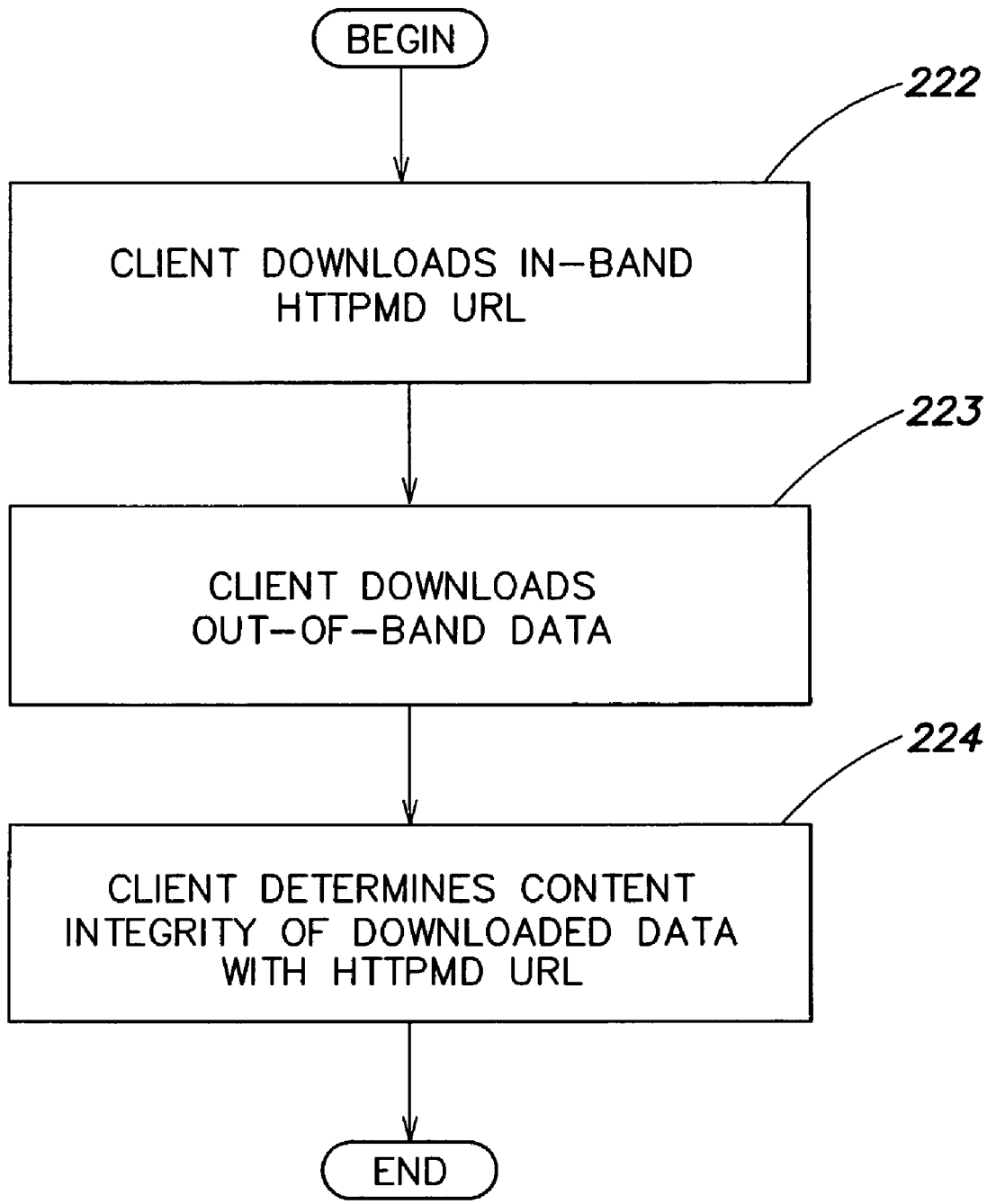
FIG. 7 is a flow chart illustrating a method according to another implementation of the invention for ensuring content integrity of data downloaded out-of-band.

An HTTPMD URL can be used in an alternative implementation, illustrated in FIG. 7, for establishing content integrity in downloaded data according to methods and systems consistent with the present invention. In this implementation, the client downloads in-band an HTTPMD URL (step 222). The client downloads out-of-band the associated data (step 223). The client determines the content integrity of the downloaded data utilizing the message digest contained in the URL (step 224). In this manner, the content integrity of data sent on a non-secure communication channel can be determined. Because the HTTPMD URL is transmitted to the client through a mechanism that guarantees the URL's integrity, the recipient can use the URL to retrieve the data specified by the URL from, for example, a non-secure HTTP server, and confirm the integrity of the supplied data transmitted over a non-secure channel by verifying that the received data's message digest matches the one specified in the URL.

The HTTPS URL scheme is used in web browsers to ensure the integrity of electronic commerce transactions. In this scheme, the integrity of the data supplied is guaranteed by the fact that the server supplying the data has been authenticated and is trusted by the client receiving the data. Once that trust relationship is in place, the underlying TLS protocol ensures that the data's contents are not tampered with.

In contrast, the HTTPMD URL scheme does not require the server to provide authentication or guarantee integrity. Once the client has received an HTTPMD URL from a trusted source, it can use the URL to download associated data and verify for itself whether that data is valid.

HTTPMD URLs may be used with a standard HTTP server. Unlike HTTPS URLs, clients are not required to know whether a particular HTTPS server is trusted. In addition, the HTTP server does not need to be configured with information that would permit it to authenticate itself. This simplification of deployment distinguishes the HTTPMD scheme from the HTTPS scheme for guaranteeing the integrity of out-of-band data. According to this implementation, HTTPMD URLs have a syntax similar to that of HTTP URLs, but include a message digest as the last parameter stored in the last segment of the path. The parameter is introduced by a semicolon (';'), and includes the name of the message digest algorithm, an equals sign ('='), the message digest represented as a hexadecimal number, and an optional comment introduced by a comma (','). In addition, a comment by itself may be specified in a relative HTTPMD URL. For example: httpmd://www.sun.com/index.html;
md5=7be207c7111e459eeea1c9b3d04f1667

As indicated, the HTTPS URL scheme depends on establishing a trust relationship with the server supplying the data. It is documented in RFC 2818, HTTP over TLS, which is available at: http://www.ietf.org/rfc/rfc2818.txt. The Transport Layer Security (TLS) protocol is documented in RFC 2246 and available at http://www.ietf.org/rfc/rfc2246.txt. The SSL protocol, utilized with the HTTPS URL in the previously described implementation, will now be described in greater detail.

The SSL Protocol

The Secure Socket Layer (SSL) protocol was originally developed by Netscape Corporation. An extended version of SSL has been adopted as an Internet standard under the name Transport Layer Security (TLS) protocol, described in RFC 2246. SSL is now integrated in most web browsers and web servers, and is also used in other applications, such as secure Telnet and FTP. Commercial and public-domain implementations are available in the form of libraries and browser plugins [www.rsasecurity.com, www.openssl.org].

SSL is a hybrid encryption scheme with authentication and key exchange based on public keys. Because the ciphers are negotiated in a handshake, it does not depend upon the availability of any particular algorithms. Nor does it depend upon any secure services at the start of session establishment. The only requirement is for public-key certificates to be issued by an authority that is recognized by both parties.

The main features of SSL are (taken from Coulouris, p. 299):

(1) Negotiable encryption and authentication algorithms—In an open network one cannot assume that all parties use the same client software or that all client and server software includes a particular encryption algorithm. SSL has been designed so that the algorithms used for encryption and authentication are negotiated between the processes at the two ends of the connection during the initial handshake. If it turns out the two processes do not have sufficient algorithms in common, the connection attempt will fail.

(2) Bootstrapped secure communication—To meet the need for a secure communication without previous negotiation or help from third parties, the secure channels are established using a hybrid protocol. Unencrypted communication is used for the initial exchanges, then public-key cryptography, and finally secret-key cryptography once a shared secret key has been established. Each step is optional and preceded by a negotiation. Thus, the secure channel is fully configurable, allowing communication in each direction to be encrypted and authenticated, but not requiring it, so that computing resources need not be consumed performing unnecessary encryption.

SSL consists of two layers sitting above the TCP/IP layers. A SSL record protocol layer implements a secure channel, encrypting and authenticating messages transmitted through any connection-oriented protocol. A SSL handshake layer implements the SSL handshake protocol and other related protocols that establish and maintain an SSL session (that is, a secure channel) between a client and server. Both layers are usually implemented by software libraries at the application level in the client and the server.

The SSL record protocol is a session-level layer. It can be used to transport application level data transparently between a pair of processes while guaranteeing its secrecy, integrity and authenticity. The communicating partners can choose whether or not to employ encryption and authentication of messages in each direction. Each secure session is given an identifier, and each partner can store session identifiers in a cache for subsequent re-use, avoiding the overhead of establishing a new session when another secure session with the same partner is required.

The SSL handshake protocol is performed over an existing connection. It begins in the clear and it establishes an SSL session by exchanging the agreed options and parameters needed to perform encryption and authentication. The handshake sequence varies depending upon whether client and server authentication are required. The handshake protocol may also be invoked at a later time to change the specification of a secured channel. For example, communication may begin using message authentication codes only. At a later point, encryption may be added. This is achieved by performing the handshake protocol again to negotiate a new cipher specification using the existing channel.

Figure 8:
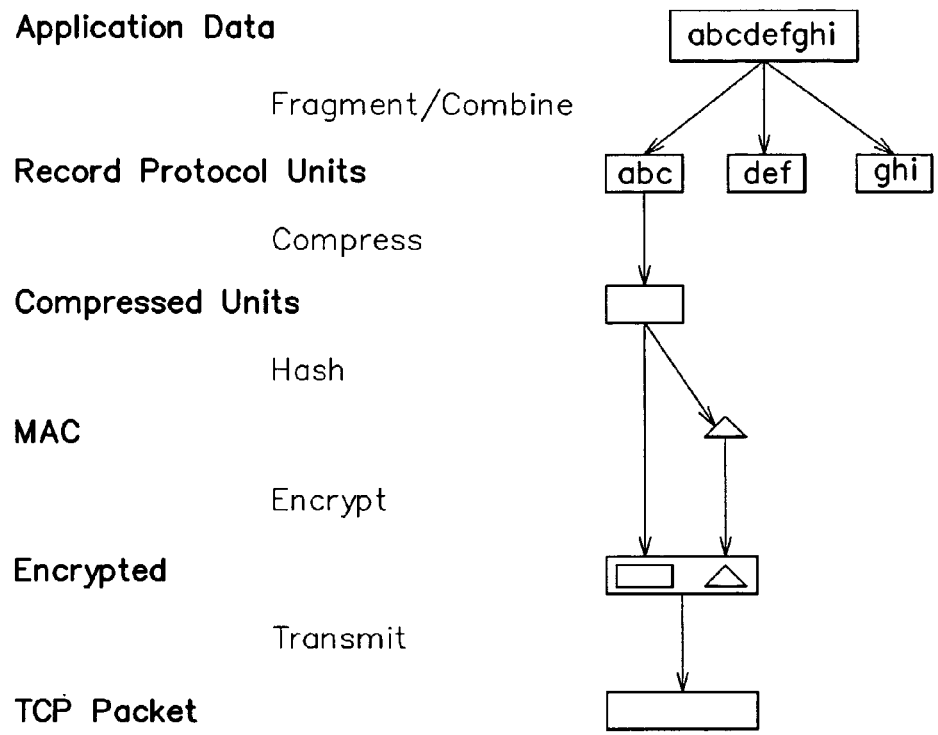
FIG. 8 is a schematic diagram illustrating one example of the operation of the Secure Sockets Layer (SSL) protocol.

FIG. 8 shows an example of the operation of the SSL record protocol (taken from Coulouris, p. 302). A message for transmission is first fragmented into blocks of manageable size, then the blocks are optionally compressed. Compression is not strictly a feature of secure communication, but may be provided so that the compression algorithm can share some of the work of processing the bulk data with the encryption and digital signature algorithms. Next, the message authentication (MAC) and encryption transformations employ the algorithms specified in the agreed cipher suite. Finally, the signed and encrypted block is transmitted to the partner through the associated TCP connection, where the transformations are reversed to produce the original data block.

Dynamic Security Policy

The Java 2 Platform security architecture provides mechanisms for enforcing fine-grained access control in a flexible and easily configurable manner. See http://Java.sun.com/j2se/1.4/docs/guide/security/index.html for general information on the Java 2 Platform Security Architecture. In it, permission objects are granted to trusted code and/or subjects, e.g., entities representing users or groups, to enable them access to private or security-sensitive resources and operations. At the core of this system is the security policy—a Java object responsible for tracking granted permissions, and using this information to decide which security checks should pass and which should fail. The default security policy provider bundled with the Java 2 Platform assigns permissions based on the contents of a text policy file; it supports permission grants to code loaded from specific code sources, to signed code, and to principals (derived from subjects). These determinants are all static in nature—in other words, they can (and must) be specified before the program to which they apply is run, they do not change while the program executes (unless the policy provider is "refreshed", in which case it rereads the policy file), and they do not depend on objects known only at runtime. For example, an application may be run with the default policy provider configured to grant certain permissions to all code signed by company Foo; this is straightforward since company Foo is known in advance and can be easily specified in the policy file.

These static grants may be insufficient, however, when dealing with more dynamic interactions where the recipients or conditions of grants may not be known until runtime. An application may need to grant permissions to code which it has just downloaded, but can identify only via an object instantiated from it, or to a previously unknown user contacting the application from a remote machine. What is required in this case is the ability to grant permissions, at runtime, to entities or code known only at runtime.

An implementation of a dynamic security policy, consistent with systems and methods of the present invention, is now described which supports dynamic permission grants during program execution. It allows grants to for example, Java class loader objects—i.e., grants which affect all classes loaded from designated class loader instances. It also allows grants to dynamically determined subject principals—e.g., those of the currently executing subject, or ones returned by a method call. Finally, since the grants occur at runtime, the granted permissions themselves may be determined dynamically.

Before describing this implementation, the following background information on the Java 2 security architecture is provided.

Java Security Mechanisms

Security mechanisms are an integral part of the Java programming language. A Java programming language compiler converts source code into the machine language of a hypothetical machine called the "virtual machine". The virtual machine code is stored in a class file with a class extension. Class files contain the codes for all methods of one class. The class files need to be interpreted by a program that can translate the instruction set of the virtual machine into the machine language of the target machine. See Core Java, vol. 2, chap. 9, p. 702, C. Horstmann et al., Sun Microsystems Press, 2000.

The virtual machine interpreter loads only those classes that a particular program requires, along with the system classes (e.g., from a JAR file). To provide more control over the class loading process, a customized class loader can be provided to load application classes. For example, the applet class loader knows how to load class files across a network and how to authenticate signed JAR files.

When a class loader presents the bytecodes of a newly loaded Java platform class to the virtual machine, the bytecodes are first inspected by a "verifier". The verifier checks to make sure the instructions of the bytecodes cannot perform damaging actions as a result of, e.g., maliciously altered class files.

Once a class has been loaded into the virtual machine by a class loader or by the default class loading mechanism and checked by the verifier, a third security mechanism of the Java platform comes into action: the "security manager". A security manager is a class that controls whether a specific operation is permitted, e.g., whether the current thread can read from or write to specified files. The default behavior while running Java applications is that no security manager is installed, i.e., no operations are prohibited. On the other hand, the appletviewer immediately installs a security manager (called AppletSecurity) that is quite restrictive.

The default security manager of the Java 2 platform allows both programmers and system administrators fine-grained control over individual security permissions by using a security policy to determine when permission checks should succeed or fail. These permissions are controlled with "policy files" as described below.

In the Java 2 platform, a "security policy" maps protection domains to permission sets. Each protection domain groups together a set of classes which are granted the same set of permissions. It is associated with a class loader from which the classes are loaded, a code source indicating the location from which the classes are loaded, and a (possibly empty) set of principals representing aspects of the identity of the entity (e.g., user) which is executing the code belonging to the classes.

A "permission" is any property that is checked by a security manager. The Java 2 platform supports a number of permission classes, each of which encapsulates the details of a particular permission. The default implementation of the Policy class reads permissions from a "policy file".

The Java 2 platform provides a "standard model" of how to carry out permission checks. The standard model relies on two classes:

java.security.SecureClassLoader java.lang.SecurityManager

These are the superclasses of the class loader and security manager that are used in many practical settings, e.g., applets and remote method invocation. Core Java, vol. 2, p. 718.

The standard model relies on a Policy object that consults the code source and principals of a protection domain in determining the set of permissions to which it maps.

Figure 9:
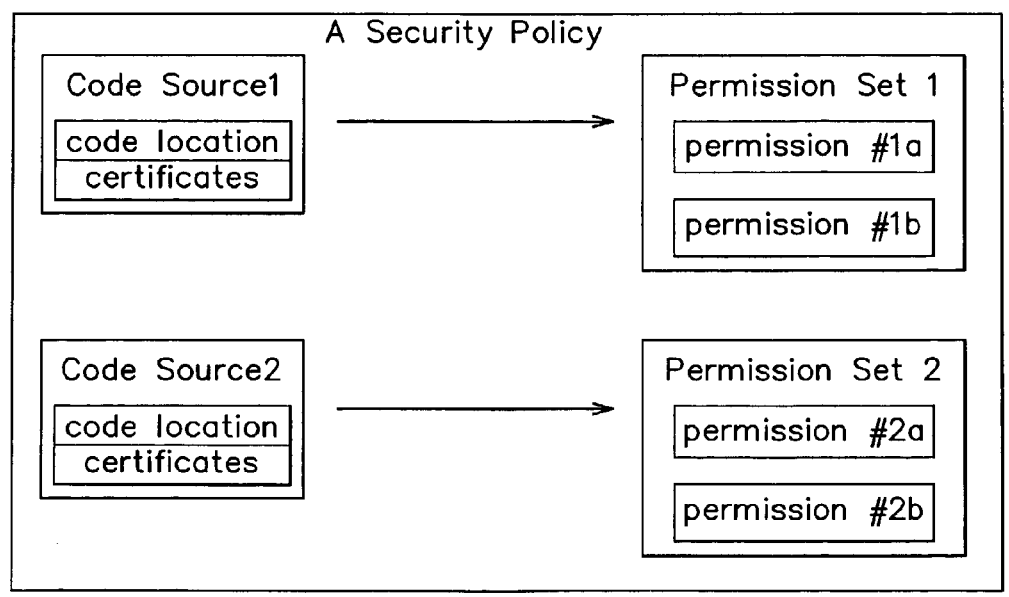
FIG. 9 is a block diagram illustrating one implementation of a security policy.
Figure 10:
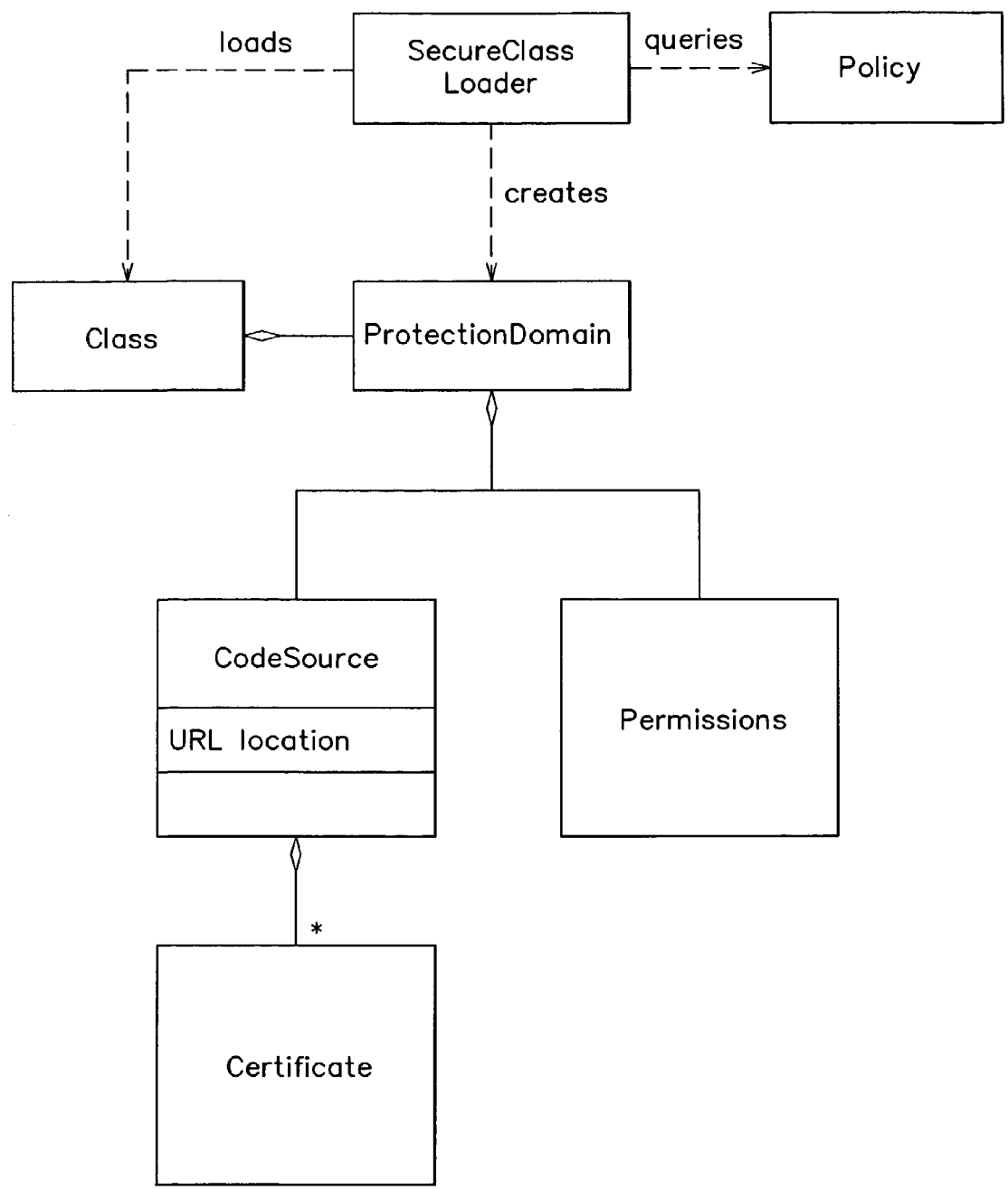
FIG. 10 is a block diagram illustrating one implementation of the relationship between classes in a Java security platform.

In the standard model, the permission collection is entirely dependent on the code source and principals. The protection domain is set when the SecureClassLoader loads the class. The SecureClassLoader queries the current policy for the permissions that match the code source. It then creates a ProtectionDomain object with the given code source and permissions. Finally, it passes that object to the defineClass method. By way of illustration, FIG. 9 shows a mapping of code sources to permission sets, and FIG. 10 shows a relationship between security classes (taken from Core Java, vol. 2, p. 719).

When the SecurityManager needs to check a permission, it looks at the classes of all methods currently on the call stack. It then gets the protection domains of all classes and asks each protection domain if its permission collection allows the operation that is currently being checked. If all domains agree, then the check passes. Otherwise, an exception is thrown.

The standard policy reads policy files that contain instructions for mapping code sources to permissions. A "policy file" contains a sequence of grant entries. Each entry has the following form:

--- grant codesource, principals
{permission_1;
permission_2
. . .
}

---

The code source contains a code base (which can be omitted if the entry applies to code from all sources) and the names of trusted certificate signers (which can be omitted if signatures are not required for this entry). The code base is specified as:

codeBase "url"

If the URL ends in a slash, then it refers to a directory. Otherwise, it is taken to be the name of a JAR file. Principals are specified using one or more entries of the form:

principal PrincipalType "principal_name"

where PrincipalType specifies the class name of the principal and principal_name specifies the name of the principal. Note that the code source and/or principals can be omitted from the grant entry.

The "permissions" have the following structure:

permission className targetName, actionList;

The class name is the fully qualified class name of the permission class, such as java.io.FilePermission. The "target name" is a permission-specific value, for example, a file or directory name for the file permission or a host and port for a socket permission. The "action list" is also permission-specific. It is a list of actions, such as read or connect, separated by commas. Some permission classes do not need target names and action lists.

One of the important uses of authentication technology is signing executable programs (Core Java, vol. 2, p. 772). If a program is downloaded, the recipient will want to know where the code comes from and that it has not been tampered with since it left its origin. If the program was written in the Java programming language, then a decision can be made about what privileges the recipient will allow the program to have. Thus, the recipient first uses authentication to verify where the code came from. Then, the recipient runs the code with a security policy that enforces the permissions that the recipient wants to grant the program, depending on its origin. The java.security package enables one to assign different levels of security, depending upon where the code originated. For example, if an applet comes from a trusted supplier and it has not been tampered with, the user of that applet can then decide to give the applet more privileges.

There are many algorithms for ensuring the integrity of data and for electronic signatures. The java.security package contains implementations of many of these algorithms. A message digest can be used to detect changes in data files, while digital signatures can prove the identity of the signer.

A message digest is a digital fingerprint of a block of data (Core Java, vol. 2, pp. 744-745). For example, the SHA1 (secure hash algorithm #1) condenses any data block, no matter how long, into a sequence of 160 bits (20 bytes). The likelihood that two of these digital fingerprints will be the same is remote.

A message digest has two properties:
1. If one bit or several bits of the data are changed, then the message digest also changes.
2. A forger who is in possession of a given message cannot (in all likelihood) construct a fake message that has the same message digest as the original.

The second property is again a matter of probabilities, and the likelihood is again remote.

A number of algorithms are used to compute these message digests, the two best known being SHA1, the secure hash algorithm developed by the National Institute of Standards and Technology, and MD5, an algorithm invented by Ronald Rivest of MIT. The Java programming language implements both. The java.security package has a MessageDigest class for creating objects that compute a message digest. The bytes of the message (to be sent) are fed to the MessageDigest object, the digest method is called, and a message digest is returned as an array of bytes.

If a message is altered, then the digital fingerprint (message digest) of the altered message will not match the digital fingerprint of the original. If the message and its fingerprint are delivered separately, then the recipient can check whether the message has been tampered with. However, if both the message and the fingerprint were intercepted, it is an easy matter to modify the message and recompute the fingerprint, as the message digest algorithms are publicly known and do not require any secret keys. In such case, the recipient of the forged message and the recomputed fingerprint would never know that the message has been altered. One way to detect this kind of alteration, when both the sender and receiver have access to a shared secret—a session key—is to append the session key to the message text when computing the message digest. No third party can produce a suitable message and message digest unless they have access to the session key. This scheme avoids the need for the public key cryptography used to implement digital signatures.

Another way to solve this problem is to use digital signatures that authenticate a message. When a message is authenticated, the recipient knows that:
1. the message was not altered
2. the message came from the claimed sender.

Core Java, vol. 2, p. 750. Digital signatures are implemented with public key cryptography, based on a public key and private key pair. The idea is to tell everyone your public key, but to hold the private key secret.

There are two kinds of public/private key pairs: for "encryption" and for "authentication". If anyone sends you a message that was encrypted with your public encryption key, then you can decrypt it with your private encryption key, but no one else can. Conversely, if you sign a message with your private authentication key, then anyone else can verify the signature by checking with your public key. The verification passes only for messages that you have signed and it fails if anyone else uses his key to sign the message. Core Java, vol. 2, pp. 750-751.

The Java security class comes with Digital Signature Algorithms (DSA) to:
1. generate a key pair
2. sign a message
3. verify a signature Implementation of Dynamic Security Policy An implementation consistent with the present invention for dynamically granting permissions at runtime will now be described. It builds upon the default security policy described above and provided as part of the Java 2 platform, which only supports static (non-dynamic) permission grants (http://java.sun.com/j2se/1.4/docs/guide/security/PolicyFiles.html). The dynamic security policy implementation described herein supports granting of permissions at runtime, as opposed to one which only supports an unchanging set of permission grants specified prior to execution.

Java security policies are implemented by objects that are instances of subclasses of the java.security.Policy class (http://java.sun.com/j2se/1.4/docs/api/java/security/Policy.html). The primary function of this class is to determine at a given point in program execution whether or not the currently executing "context" possesses (i.e., is permitted to exercise an action represented by) a particular permission. Here, "context" refers to those aspects of program state relevant in determining whether or not a permission check should pass, e.g., the current execution stack, and the currently-executing subject (user). The security policy issues these decisions by means of the following method:

public boolean implies(ProtectionDomain domain,
    Permission permission)

The domain parameter passes information about currently executing code, e.g., where it was loaded from, who it was signed by, what subject it is executing on behalf of. The permission parameter indicates what permission to check. If the permission check is successful, i.e., the action should be permitted, then the implies method returns true, otherwise it returns false.

Figure 11:
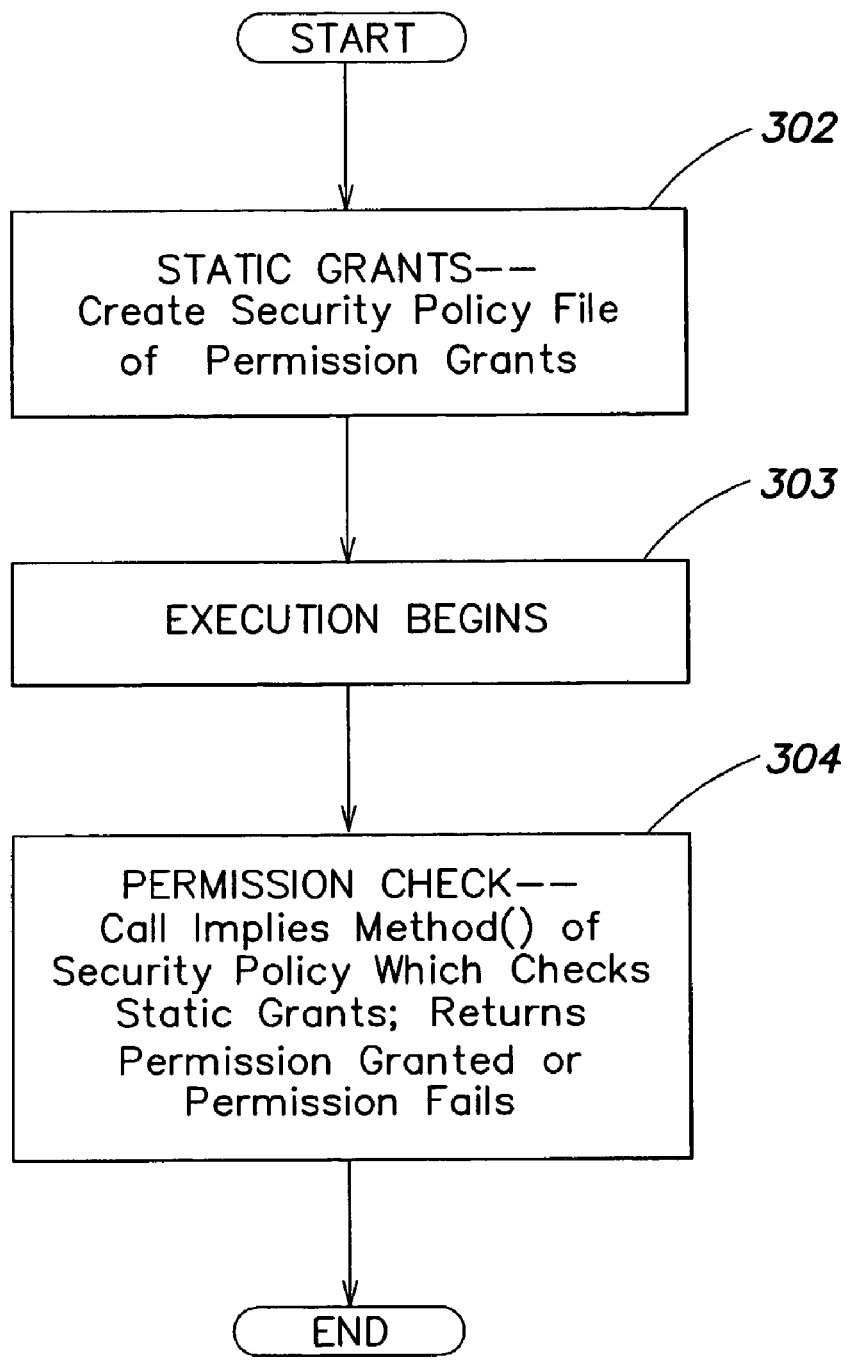
FIG. 11 is a flow chart illustrating a known method for creating and checking static permission grants.

The default (static) Java 2 security policy operates essentially as shown in FIG. 11. At the start of program execution, it reads in a security policy file describing a finite set of permission grants (step 302), e.g., grant permission P1 to all code loaded from directory D; grant permission P2 to all code signed by Fred. After execution has begun (step 303), when the need for a security check arises, the security infrastructure invokes the aforementioned implies( ) method of the security policy (step 304). The implies method then iterates down the list of static permission grants to see if any apply to the given ProtectionDomain/Permission pair.

Figure 12:
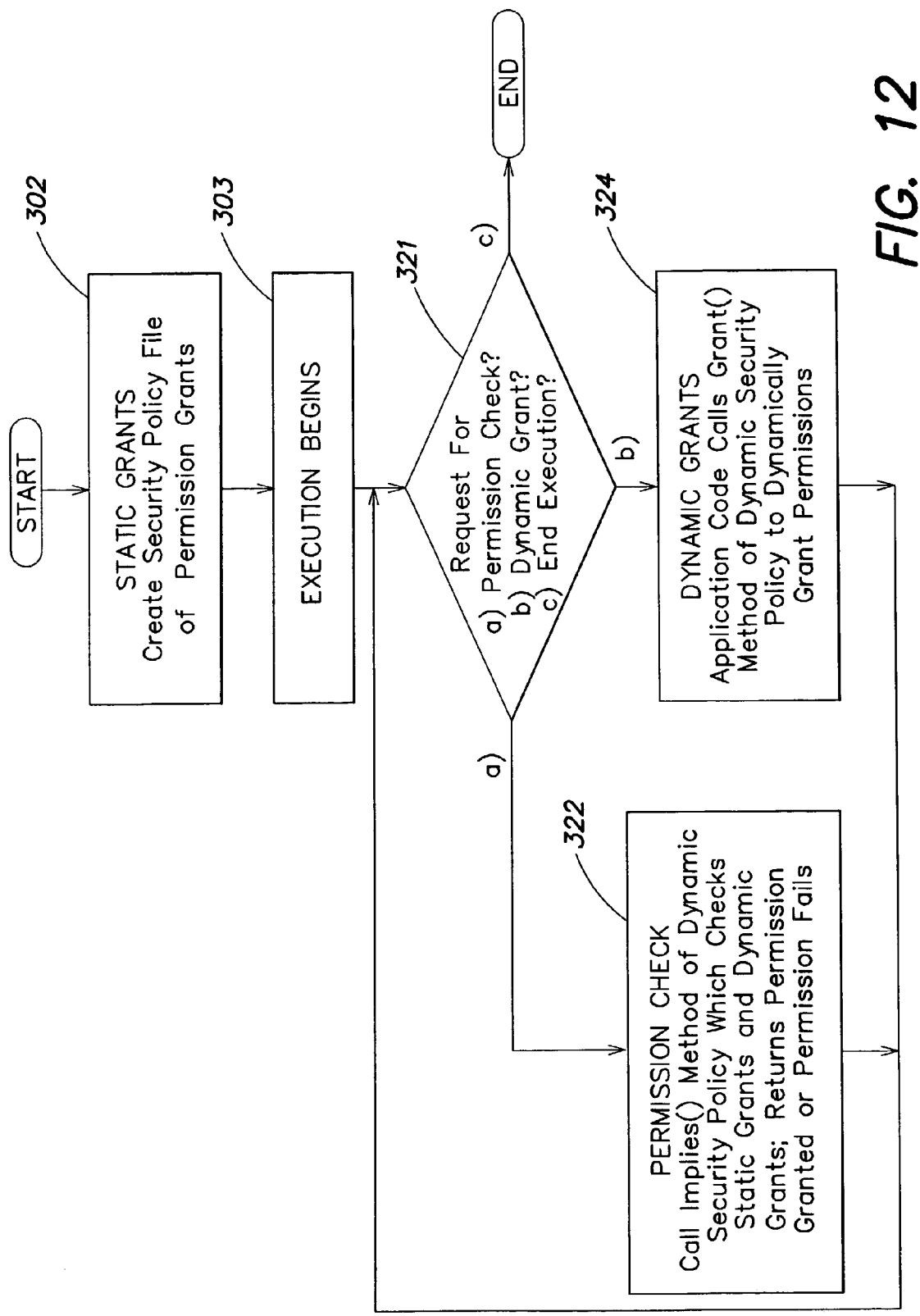
FIG. 12 is a flow chart illustrating a method according to one implementation of the invention for creating and checking dynamic permission grants.

In contrast, an implementation of the dynamic security policy is shown in FIG. 12, which may include both the prior step 302 of creating static grants but now further may include support for creating and checking dynamic grants. After execution begins (step 303), it provides to the application (seeking permission) an API for granting permissions at runtime (step 324). This API consists of a grant( ) method defined by the policy object, as follows:

> public void grant(Class cl, Principal[] principals, Permission permission)

By calling this method (step 324), application code requests that the given permission be granted to the specified combination of class loader and principal(s). A "principal" represents some facet of subject (user) identity. Note that in some cases this grant operation may fail, such as when the caller does not itself have adequate permissions to authorize the grant.

Again, when the need for a security check arises (step 321), the security infrastructure will invoke the policy object's implies( ) method (step 322). However, the implies( ) method of the dynamic policy is implemented to consider dynamic grants issued at runtime via the dynamic policy's grant method, in addition (perhaps, though not necessarily) to static permission grants specified at startup.

One example is the following sequence of events:

1. Permission check occurs for permission P against protection domain PD. At this time, PD has not been granted P, so the permission check fails.
2. Application code calls the grant method of the dynamic policy, passing class C which belongs to the protection domain PD, an empty array of principals (indicating that the permission grant applies across all subjects), and P.
3. A second permission check occurs for permission P against protection domain PD. This time, since P has been dynamically granted to C's class loader, the permission check passes.

Thus, the dynamic policy provider grants permissions on the granularity of class loader. It also provides support for associating security sub-policies with context class loaders. If a sub-policy is registered for a given class loader, it handles permission queries and grants when the class loader is the current context class loader or the nearest parent of the context class loader for which a sub-policy has been set.

This implementation of the dynamic policy provider uses the same policy file mechanism and syntax as the default security policy implementation distributed as part of the Java 2 platform.

To associate a new sub-policy with a given class loader, overriding any previous sub-policy associated with the class loader, the following method is provided:

> addPolicy(ClassLoader loader, String policyFile)

To return a set of permissions allowed for code from the specified code source as a newly-created permission collection (which supports heterogeneous permission types), the following method is provided:

> getPermissions(CodeSource source)

To return a set of permissions allowed for code in the specified protection domain as a newly-created permission collection (which supports heterogeneous permission types), the following method is provided:

> getPermissions(ProtectionDomain domain)

The following constructor creates a DynamicPolicyProvider whose starting set of permission mappings is the same as those that would result from constructing a new instance of the default (policy-file based) security policy provider with the "java.security.policy" system property set to the value of policyFile:

> public DynamicPolicyProvider(String policyFile)

The parameter policyFile is a URL string specifying the location of the policy file to use, or null if the current value of the "java.security.policy" system property should be used.

The implies method of the DynamicPolicyProvider overrides the implies method in class Policy. The two parameters of the implies method include "domain" which specifies the protection domain in which to check implication, and "permission" which is the permission to test implication of. The implies method returns true if permission is implied by permissions of the given protection domain, false otherwise.

If the given protection domain is the protection domain of this class, then true is returned. Otherwise, the main policy or appropriate sub-policy is consulted.

Example of a Distributed System Implemented in Java™ Programming Language

In a distributed system implemented using the Java™ programming language, services appear programmatically as objects, with interfaces that define the operations available from the service. A "class" provides a template for the creation of "objects" having characteristics of that class. Thus, a class defines the type of an object. Methods associated with the class are generally invoked on the objects of the same class or subclass. The Java programming language is described in *The Java Language Specification* by James Gosling, Bill Joy and Guy Steele, Addison-Wesley, 1996, which is incorporated herein by reference.

In a Java distributed system, an object is referred to as being remote when its methods can be invoked from another address space, typically a Java virtual machine on a different computer. A remote object is described by one or more remote interfaces, which are Java interfaces that declare the methods of the remote object. Remote Method Invocation (RMI) is used to invoke a method of a remote interface on a remote object. RMI is explained in, for example, the Remote Method Invocation Specification, Sun Microsystems, Inc., 1997, available at http://www.java.sun.com/products/jdk/1.2/docs/guide/rmi/spec/rmiTOC.doc.html, which is incorporated herein by reference.

Figure 13:
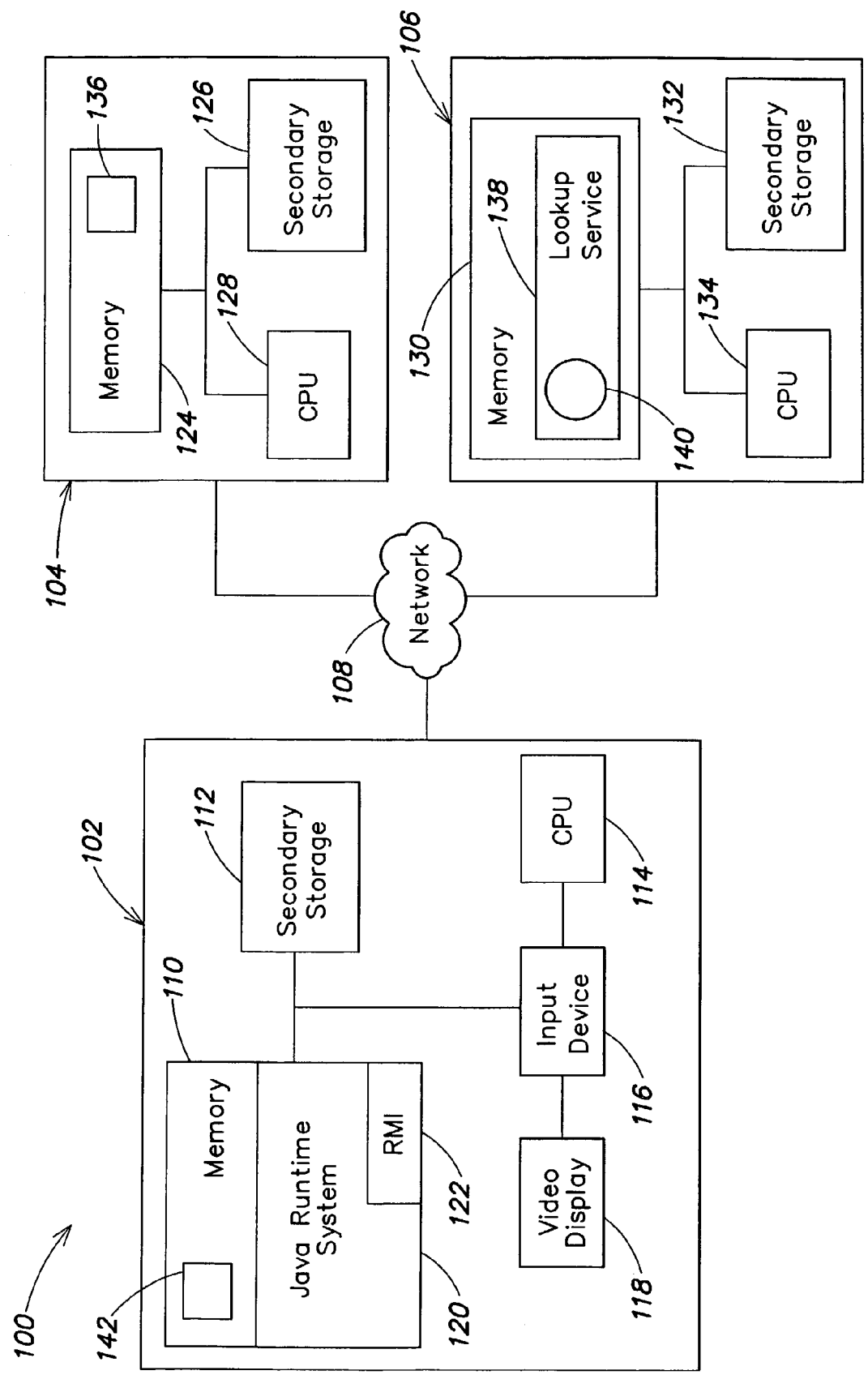
FIG. 13 is a block diagram of one implementation of a distributed system implemented in Java.

FIG. 13 depicts one implementation of such a Java/Jini distributed system 100 suitable for practicing methods and systems consistent with the present invention. Distributed system 100 includes a plurality of computers 102, 104, and 106, communicating via a network 108. Network 108 may be a local area network, wide area network, or the Internet. Computer 102 includes a memory 110, a secondary storage device 112, a central processing unit (CPU) 114, an input device 116, and a video display 118. Memory 110 includes a client program 142 and Java runtime system 120, which includes a Java Remote Method Indication (RMI) system 122.

Computers 104 and 106 may be similarly configured, with computer 104 including memory 124, secondary storage device 126, and CPU 128, and computer 106 including memory 130, secondary storage device 132, and CPU 134. Memory 124 of computer 104 includes a service 136, and memory 130 of computer 106 includes a lookup service 138 that defines the services available in one part of distributed system 100. Lookup service 138 contains one proxy object for each service within that part of distributed system 100. Each "proxy" object such as 140 corresponds to a service in the distributed system and implements interfaces corresponding to methods available from a service.

For example, if service 136 were a database service, the corresponding proxy object 140 would implement database interfaces such as "find" or "sort". To invoke methods on database service 136, client 142 asks lookup service 138 for a proxy to the database service. In response, lookup service 138 returns proxy object 140 corresponding to database service 136 to the client. Lookup services are explained in greater detail in U.S. Pat. No. 6,185,611, entitled "Dynamic Lookup Service in a Distributed System," which is incorporated herein by reference.

Figure 14:
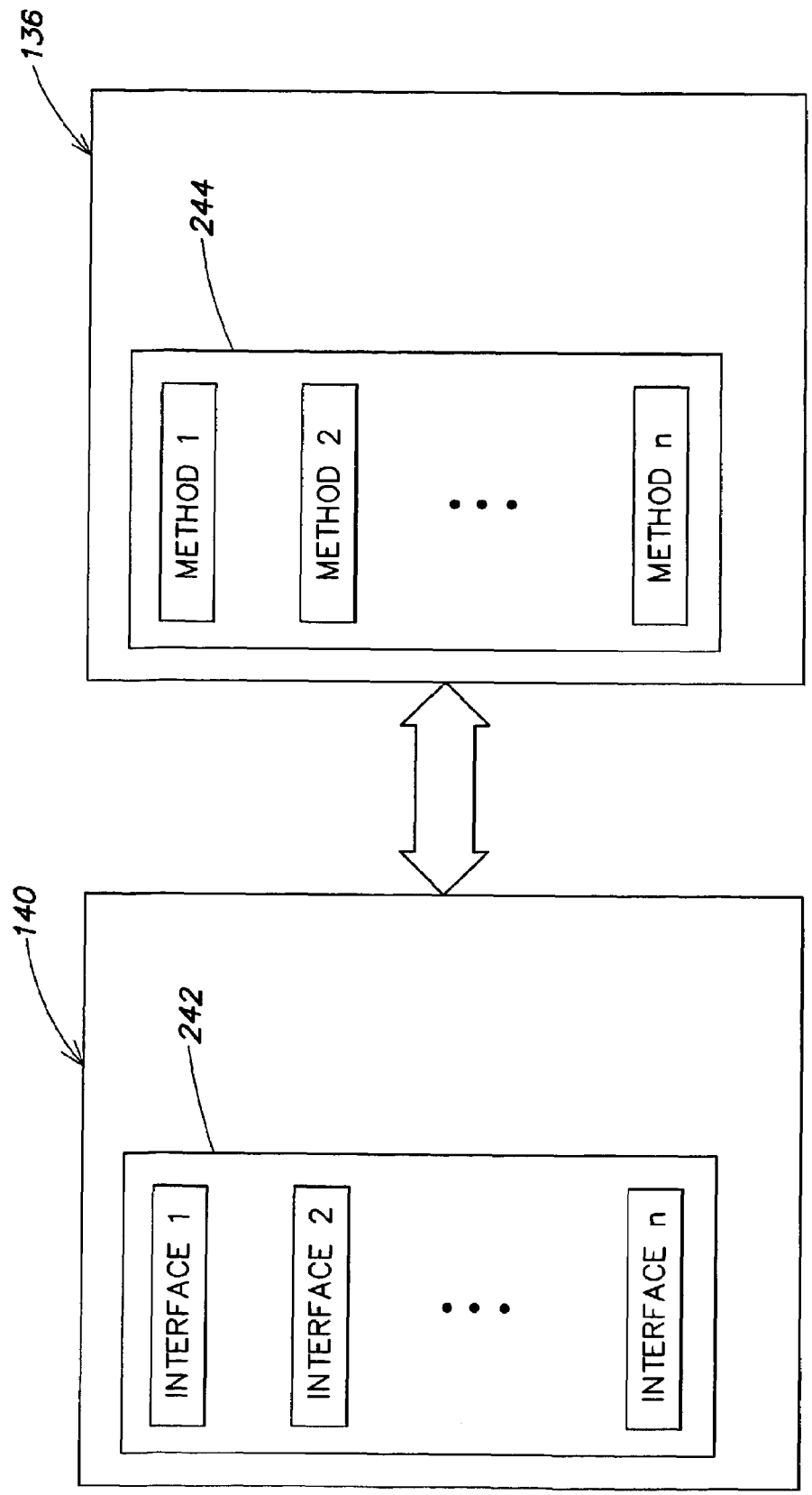
FIG. 14 is a schematic diagram illustrating a logical interaction between a client program and service in a Java system.

FIG. 14 depicts the logical interaction between client program 142 and service 136 once the client has downloaded proxy 140. Proxy 140 implements one or more interfaces 242 corresponding to the methods 244 offered by service 136. Client 142 invokes methods on proxy 140. Proxy 140 processes method invocations, communicates with service 136 to execute the requests of client 142, and returns results. The protocol between proxy 140 and service 136 is not set by the Jini™ system; instead, it is determined by the service and its proxy. This enables a client to communicate with a service it may have never seen before without knowing or caring how the service works.

In this way, the Jini architecture relies on downloaded code to provide services in a dynamic and flexible way. Once a client downloads a proxy object, the client invokes methods on the proxy to communicate with the remote service. However, the proxy may be implemented using code that the client does not trust. Before sharing any critical data with the service, the client should preferably establish trust in the proxy, the service, or both.

Sun, Sun Microsystems, the Sun logo, Java, and Jini trademarks are registered trademarks of Sun Microsystems, Inc. in the United States and other countries.

Alternative Implementations

The client-server embodiments described herein are not meant to be limiting of the present invention. In an alternative distributed system, all processes may perform similar roles, interacting cooperatively as "peers" to perform a distributed activity or computation, without any distinction between clients and servers. This peer architecture may provide a better interactive response for users of distributed shared objects than could generally be obtained with a server-based architecture.

Another architectural model for a distributed system is the provision of a service by multiple servers. Services may be implemented as several server processes in separate host computers, which interact as necessary to provide a service to client processes. The servers may partition a set of objects from which the service is based and distribute them between themselves, or they may maintain replicated copies of them on several hosts.

In yet another architectural model of a distributed system, a cache may be used to provide faster access to select objects, such as recently used objects. For example, web browsers maintain a cache of recently-visited web pages and other web resources in the client's local file system, using a special HTTP request to check with the original server that cached pages are up-to-date for displaying them. Web proxy servers provide an alternative form of shared cache of web resources for the client machines at a site or across several sites. The purpose of proxy servers is to increase availability and performance of the server by reducing the load on the wide area net and web servers. Proxy servers can also take on other roles in the network, for example they may be used to access remote web servers through a firewall.

Other implementations and embodiments of the invention will be apparent to those skilled in the art from consideration of the specification and practice of the invention disclosed herein. It is intended that the specification and examples be considered as exemplary only, with a true scope of the invention being indicated by the following claims.

The invention claimed is:

1. A method comprising:
 making a remote call to an object in a distributed system, the object comprising object code and object data, the object code corresponding to a code base Universal Resource Locator (URL);
 downloading the code base URL in-band;
 downloading the object, the download of the object being split into: an in-band download of the object data and an out-of-band download of the object code using the code base URL; and
 verifying the integrity of the object code using a content integrity protecting feature of the code base URL.

2. The method of claim 1, wherein the downloading of the object data and object code comprises downloading the object data and the object code in a remote method invocation.

3. The method of claim 1, further comprising, prior to using the code base URL, confirming that the code base URL is a content integrity protecting URL.

4. The method of claim 1, wherein the out-of-band download employs a protocol identified in the code base URL.

5. The method of claim 1, wherein a message digest included in the code base URL is used to verify the integrity of the downloaded object code.

6. The method according to claim 1, wherein the in-band downloads of the code base URL and the object data use an encrypted channel and the out-of-band download of the object code is independent of the encrypted channel.

7. The method according to claim 6, wherein the encrypted channel is an SSL channel and the code base URL is an HTTPS URL.

8. The method according to claim 1, wherein the code base URL is an HTTPMD URL containing a message digest.

9. The method according to claim 8, wherein the downloaded object code is verified using the message digest.

10. A method comprising:
 making a remote call to an object in a distributed system, wherein the object is split into object code and object data, the object code corresponding to a code base Universal Resource Locator (URL);
 downloading the code base URL, wherein the code base URL is downloaded in-band;

downloading the object code, wherein the object code is downloaded out-of-band; and verifying the integrity of the object code using a content integrity protecting feature of the code base URL.

11. The method of claim 10 wherein downloading the object code out-of-band occurs when it has been determined that the code base URL is a content integrity protecting URL.

12. A computer-readable medium containing instructions to perform a method in a distributed system, the method comprising:

making a remote call from a client to an object in a distributed system, the object comprising object data and object code, the object code corresponding to a code base Universal Resource Locator (URL);

downloading the code base URL in-band;

downloading the object, the download of the object being split into:

an in-band download of the object data and an out-of-band download of the object code using the code base URL; and verifying the integrity of the object code using a content integrity protecting feature of the code base URL.

* * * * *